US006386656B1

(12) United States Patent
Chen

(10) Patent No.: US 6,386,656 B1
(45) Date of Patent: May 14, 2002

(54) COMPUTER ENCLOSURE INCORPORATING PIVOTABLE DRIVE BRACKET

(75) Inventor: Yun Long Chen, Chung-Ho (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/709,055

(22) Filed: Nov. 8, 2000

(30) Foreign Application Priority Data

Sep. 26, 2000 (TW) ........................................ 089216653

(51) Int. Cl.7 ............................................. A47B 97/00
(52) U.S. Cl. ..................... 312/223.2; 361/727
(58) Field of Search ........................... 312/223.1, 223.2, 312/265.1, 265.2, 265.3, 265.4, 265.5, 265.6, 257.1, 263; 211/26; 361/724, 725, 726, 727, 683, 685

(56) References Cited

U.S. PATENT DOCUMENTS 5,447,367 A * 9/1995 Wei .......................... 312/223.2
5,584,396 A * 12/1996 Schmitt .................... 361/727 X
5,599,080 A * 2/1997 Ho .......................... 361/685 X
5,995,364 A * 11/1999 McAnally et al. ....... 361/725 X
6,272,009 B1 * 8/2001 Buican et al. ............ 361/727 X
6,313,983 B1 * 11/2001 Liu et al. ................. 361/727 X

* cited by examiner

Primary Examiner—James O. Hansen
(74) Attorney, Agent, or Firm—Wei Te Chung

(57) ABSTRACT

A computer enclosure includes a chassis (20), a first drive bracket (40), and a second drive bracket (60) secured in the chassis by a fastener (90). A front panel (22) of the chassis defines a first opening (24), a second opening (26), and a pair of slots (34). The first drive bracket is accommodated in the chassis adjacent the first opening. The first drive bracket has a first retaining portion (50) and a retaining breach (48), which respectively engage with a retaining cutout (70) and a second retaining portion (72) of the second drive bracket. Two hooks (80) are formed on the second drive bracket for being received in the slots, allowing the second drive bracket to be rotated from a first position outside the chassis to a second position within the chassis adjacent the second opening. The fastener is pivotally attached to the first drive bracket.

11 Claims, 6 Drawing Sheets

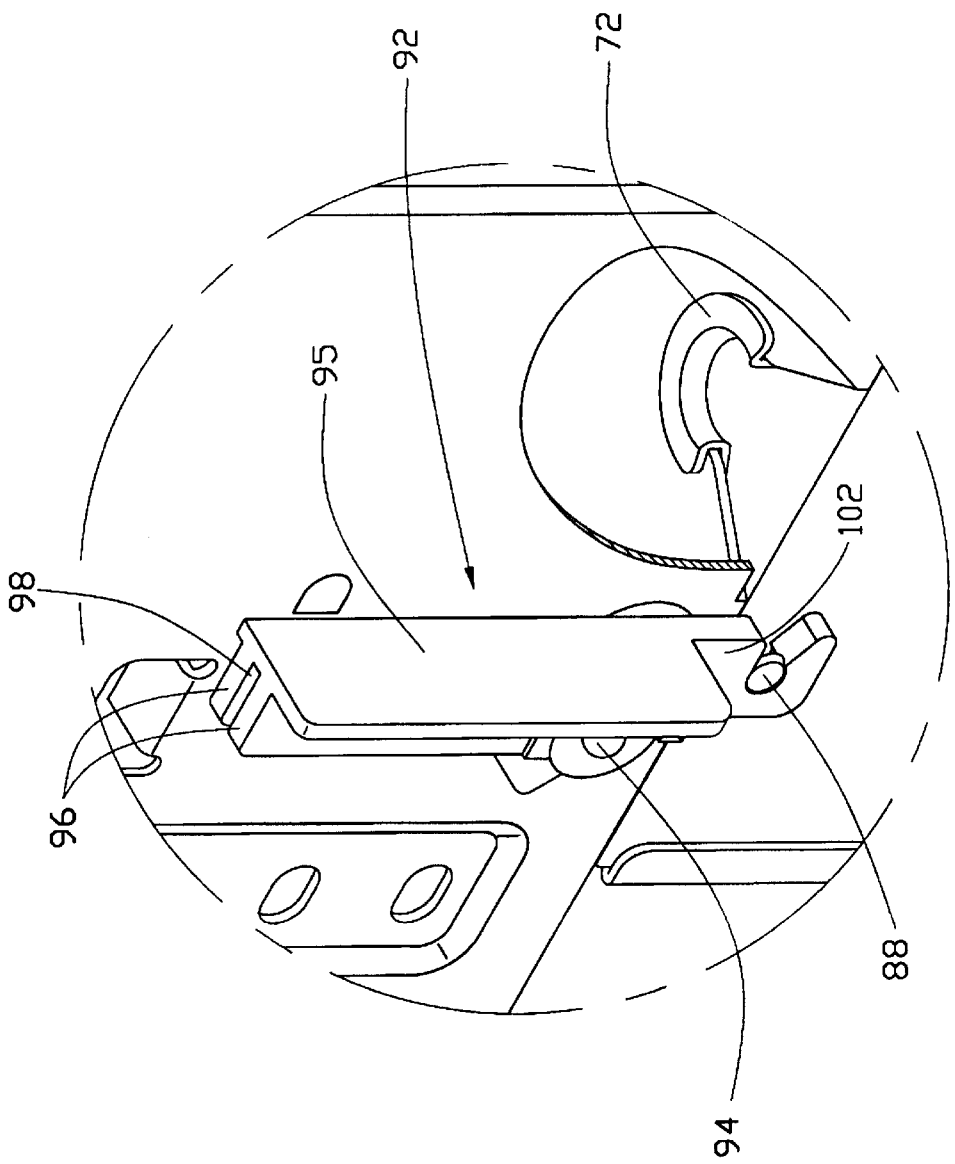

COMPUTER ENCLOSURE INCORPORATING PIVOTABLE DRIVE BRACKET

BACKGROUND

1. Field of the Invention

The present invention relates to a computer enclosure, and particularly to a computer enclosure incorporating a pivotable drive bracket.

2. Related Art

Various data storage devices are installed in computers for communication and handling of data. Such devices include, for example, hard disk drives, floppy disk drives, and CD-ROM drives. A drive bracket is often included in a computer enclosure for accommodating a data storage device therein.

As shown in U.S. Pat. No. 5,447,367, a conventional drive bracket is attached to a computer enclosure with bolts. However, attachment with bolts is unduly complicated and time-consuming.

Thus rails have been developed to mount a data storage device to a computer enclosure. Such rails are shown in U.S. Pat. No. 5,599,080. The data storage device is secured to a mounting device by pushing pins formed on the guide rail into side holes defined in the data storage device. Then, the mounting device is slidably mounted into the computer enclosure. However, the pins are thin and pliable, and are easily bent or damaged during the installation procedure. Once the pins have become bent or damaged, subsequent realignment and reconnection of the data storage device to the enclosure is quite difficult. Moreover, the enclosure must provide long guiding tracks for slidingly inserting the mounting device therein. This type of enclosure is unduly complicated in structure.

SUMMARY OF THE INVENTION

Accordingly, an object of the present invention is to provide a computer enclosure incorporating a pivotable drive bracket which is readily and firmly attached to the computer enclosure.

Another object of the present invention is to provide a computer enclosure incorporating a drive bracket which allows easy access to serviceable components located below the drive bracket.

To achieve the above-mentioned objects, a computer enclosure in accordance with the present invention comprises a chassis, a first drive bracket, and a second drive bracket secured in the chassis by a fastener. A front panel of the chassis defines a first opening, a second opening, and a pair of slots. The first drive bracket is accommodated in the chassis adjacent the first opening. The first drive bracket has a first retaining portion and a retaining breach, which respectively engage with a retaining cutout and a second retaining portion of the second drive bracket. Two hooks are formed on the second drive bracket for being received in the slots, thereby allowing the second drive bracket to be rotated from a first position outside the chassis to a second position within the chassis adjacent the second opening. The fastener is pivotally attached to the first drive bracket and secures the second drive bracket in the second position.

Other objects, advantages and novel features of the present invention will be drawn from the following detailed embodiment of the present invention with attached drawings, in which:

BRIEF DESCRIPTION OF THE DRAWINGS

FIG. 6 is an enlarged view of an encircled portion VI of FIG. 5.

DESCRIPTION OF THE PREFERRED EMBODIMENT

Figure 1:
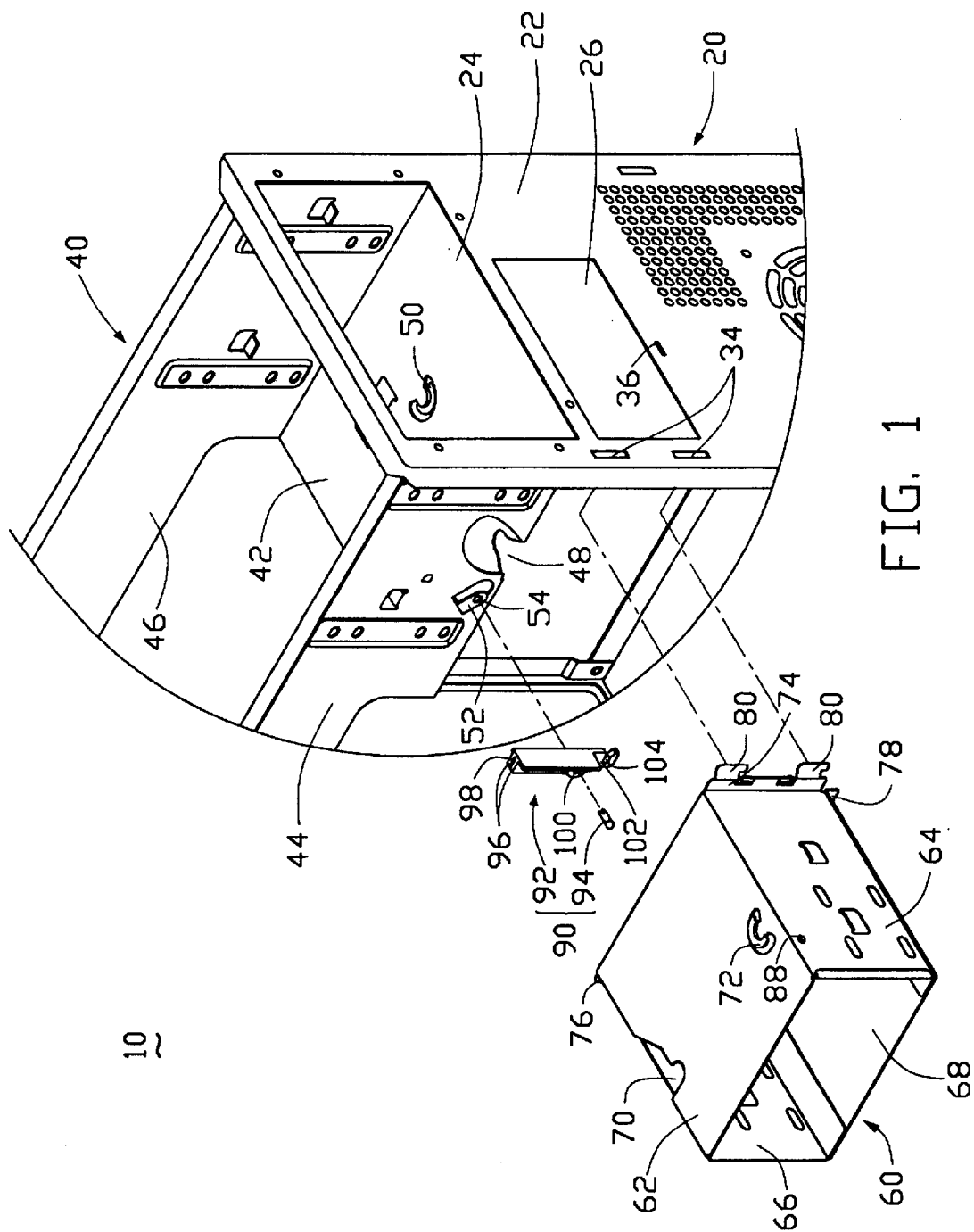
FIG. 1 is an exploded view of a computer enclosure in accordance with the present invention.

Referring to FIG. 1, a computer enclosure 10 of the present invention comprises a chassis 20, a first drive bracket 40, a second drive bracket 60, and a fastener 90.

The chassis 20 comprises a front panel 22. The front panel 22 defines a first opening 24, and a second opening 26 below the first opening 24. A pair of vertical slots 34 is defined in the front panel 22 between a side of the second opening 26 and a nearest side edge of the front panel 22. A retaining aperture 36 is defined in the front panel 22 below the second opening 26.

The first drive bracket 40 is accommodated in the chassis 20 adjacent the first opening 24. The first drive bracket 40 comprises a bottom wall 42, and first and second side walls 44, 46 extending upwardly from respective opposite lateral edges of the bottom wall 42. A retaining breach 48 is defined through both the bottom wall 42 and the first side wall 44. The bottom wall 42 is stamped downwardly in a center portion thereof to form a first retaining portion 50. An external L-shaped pivot portion 52 is formed in the first side wall 44 inwardly from the retaining breach 48. A through hole 54 is defined in the pivot portion 52 near a free end thereof.

Figure 2:
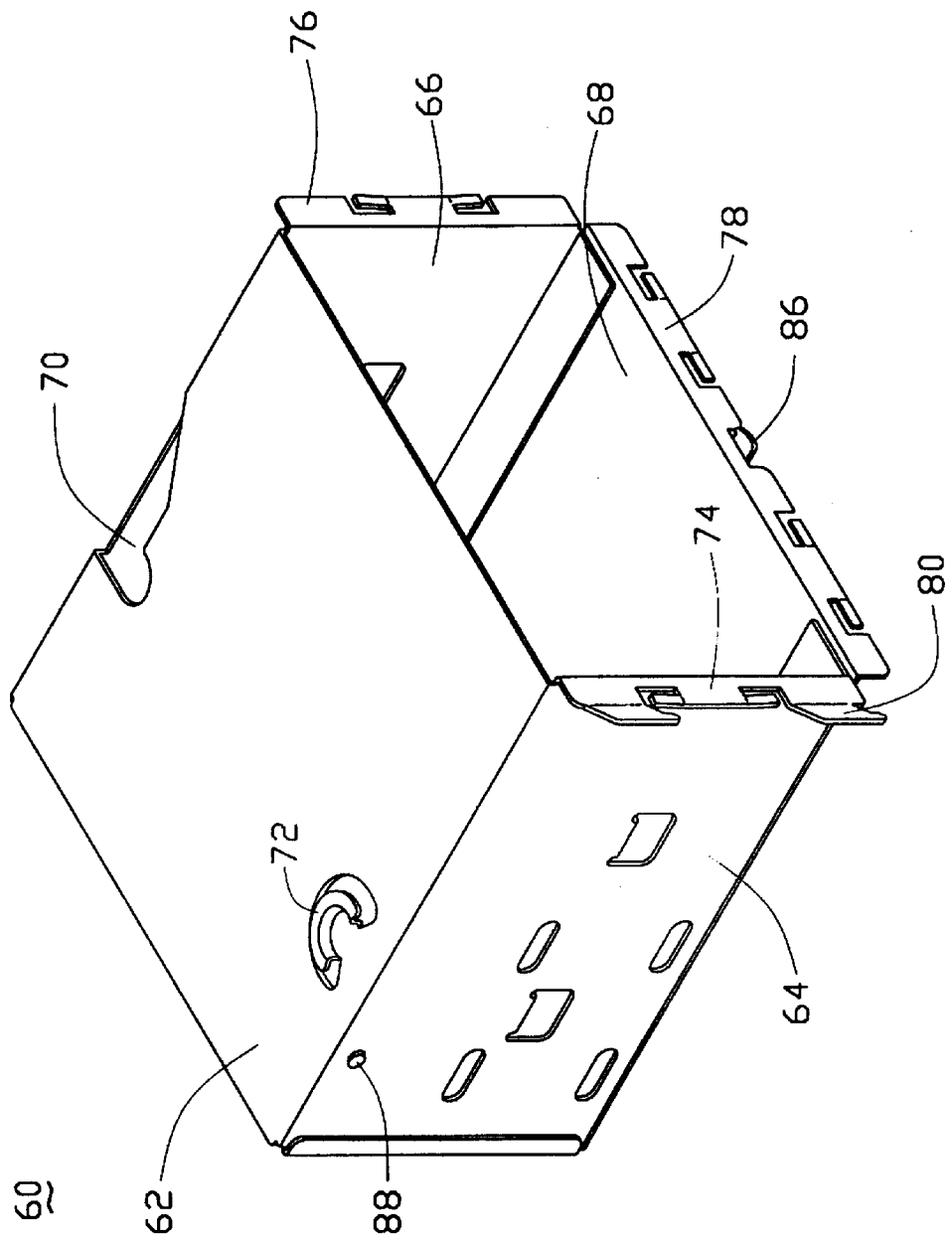
FIG. 2 is a perspective view of a second drive bracket of FIG. 1, but viewed from another aspect.

Referring also to FIG. 2, the second drive bracket 60 is boxshaped and comprises a top panel 62, first and second side panels 64, 66 depending from the top panel 62, and a bottom panel 68. A retaining cutout 70 is defined through both the second side panel 66 and the top panel 62. An external second retaining portion 72 is formed in the top panel 66 near the first side panel 64. The second retaining portion 72 is similar in shape to the first retaining portion 50 of the first drive bracket 40. An external protrusion 88 is formed at a rear portion of the first side panel 64 near the top panel 62. A pair of first and second flanges 74, 76 is formed from respective opposite free edges of the first and second side panels 64, 66. The first and second flanges 74, 76 extend perpendicularly outwardly in opposite directions from the said free edges. A pair of bent hooks 80 further extends outwardly from a vertical distal edge of the first flange 74, for engaging with the pair of slots 34 of the chassis 20. A third flange 78 depends from a free edge of the bottom panel 68, between the first and second flanges 74, 76. An external tab 86 is formed in the third flange 78, for engaging with the retaining aperture 36 of the chassis 20.

Figure 3:
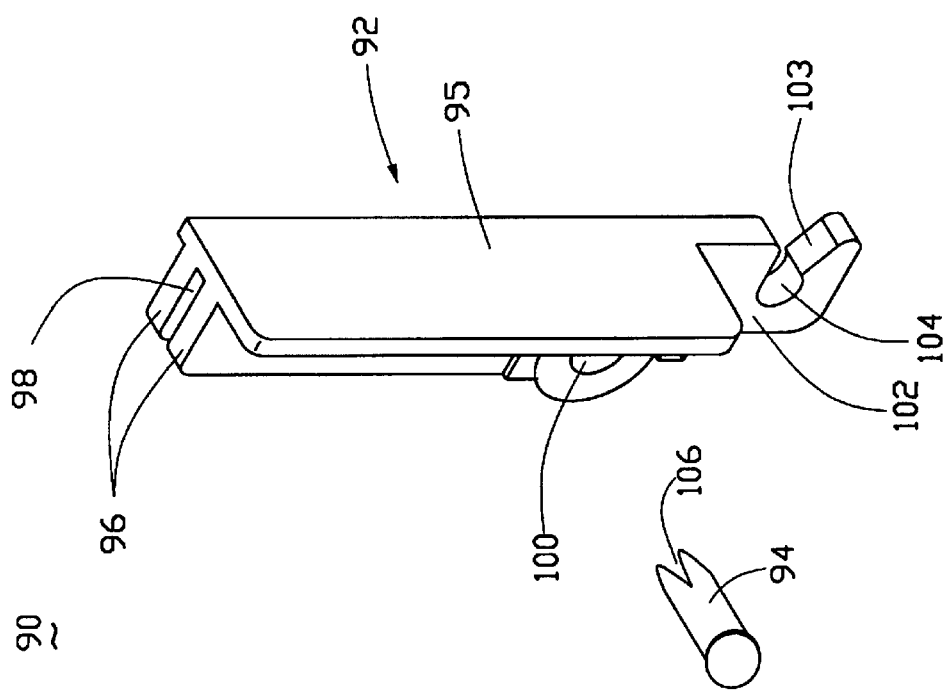
FIG. 3 is an exploded view of a fastener of FIG. 1.

Referring also to FIG. 3, the fastener 90 comprises a body 92 and a post 94. The body 92 has a base 95, and a pair of parallel beams 96, 98 extending perpendicular from one side of the base 95. The beams 96, 98 are uniformly spaced apart, thereby defining a channel 98 therebetween. A pair of concentric pivot holes 100 is respectively defined in the pair of beams 96, 98 at a mutual end thereof, for extension of the post 94 therethrough. A tail 102 with an internal guide face 103 extends from an end of the base 95 near the holes 100. A cutout 104 is defined in the tail 102. A groove 106 is defined in an end of the post 94, for improving the elastic deformability thereof.

Figure 4:
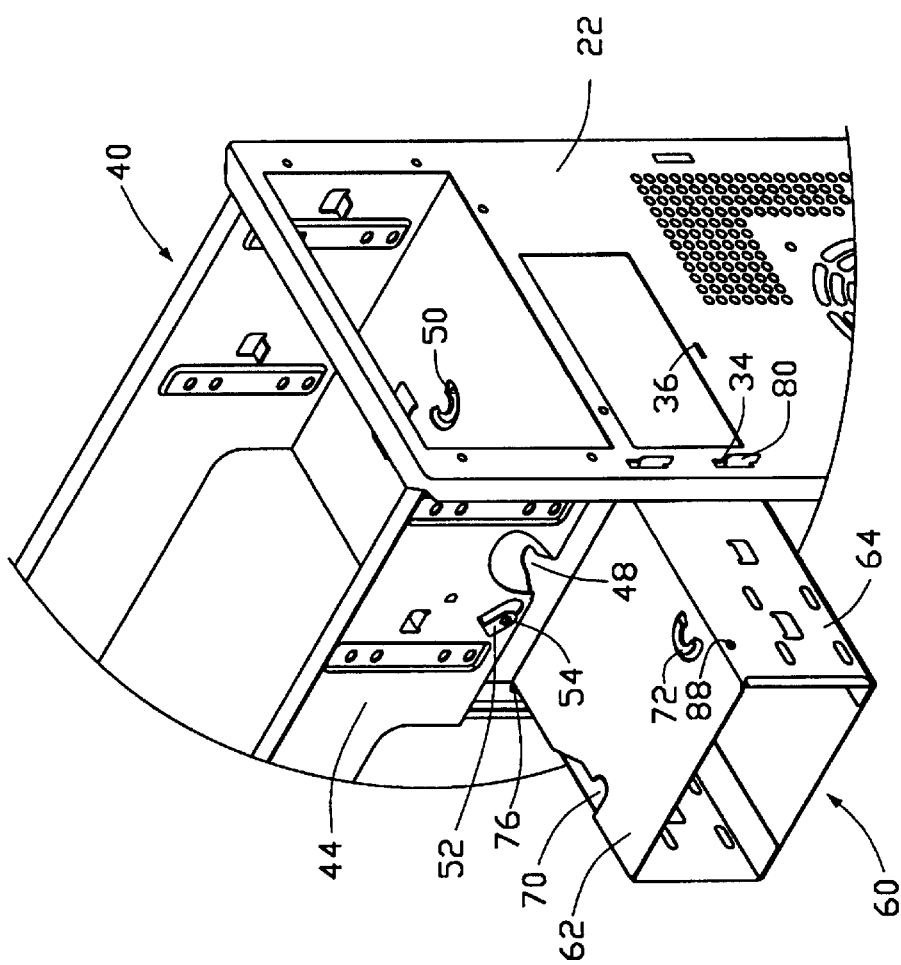
FIG. 4 is a partly assembled view of FIG. 1, showing the second drive bracket in a first position.
Figure 5:
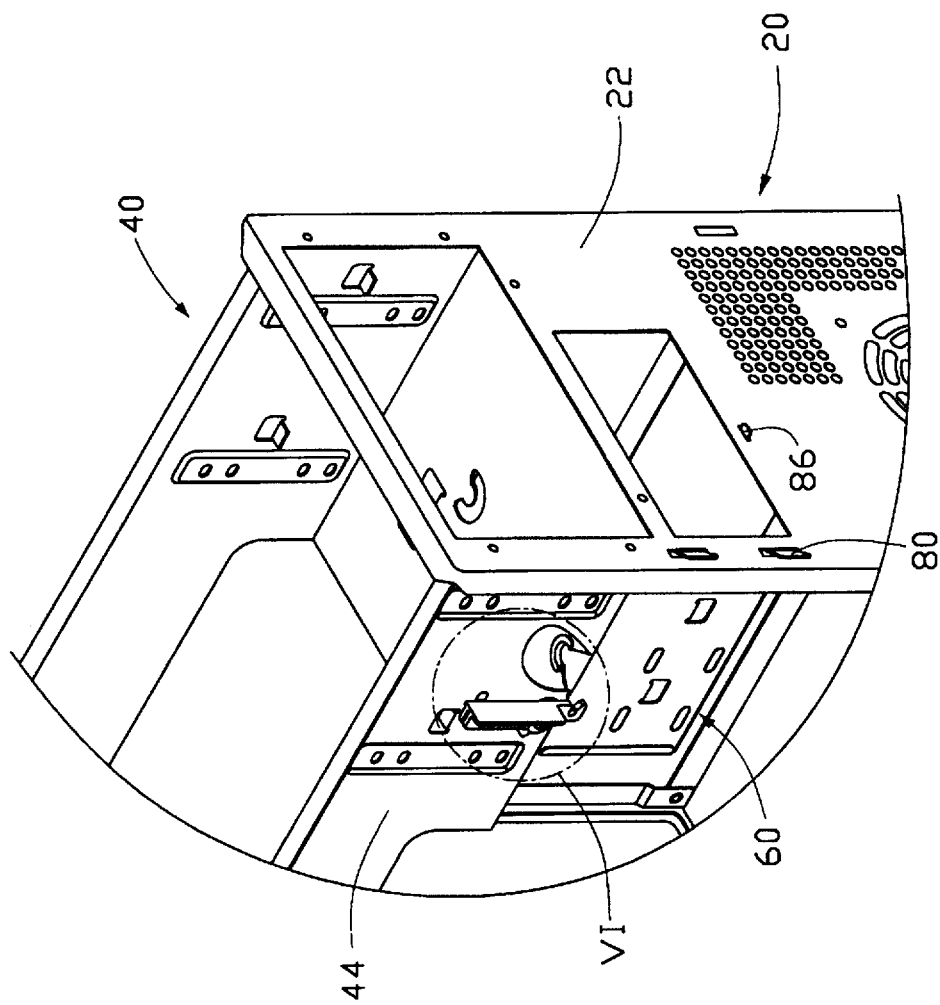
FIG. 5 is an completely assembled view of FIG. 1, showing the second drive bracket in a second position.

Referring also to FIGS. 4–6, in assembly, the first drive bracket 40 is inserted into a top portion of the chassis 20, such that it sits adjacent the first opening 24. The first drive bracket 40 is secured to the front panel 22 of the chassis 20 by conventional means. The second drive bracket 60 is attached to the chassis 20, with the hooks 80 of the drive bracket 60 engaging with the slots 34 of the chassis 20. In this position, the second drive bracket 60 is essentially outside the chassis 20 and releasable from the panel (see FIG. 4). At this stage, the second drive bracket 60 is defined to be in a first position.

The second drive bracket 60 is then rotated about the slots 34 until it is completely accommodated within the chassis 20, such that it sits below the first drive bracket 40 and adjacent the second opening 26. The flanges 74, 76, 78 of the second drive bracket 60 abut an inner surface of the front panel 22 of the chassis 20. The tab 86 of the second drive bracket 60 engages with the retaining aperture 36 of the chassis 20. The first retaining portion 50 of the first drive bracket 40 engages with the retaining cutout 70 of the second drive bracket 60, and the second retaining portion 72 of the second drive bracket 60 engages with the retaining breach 48 of the first drive bracket 40. In this position, the second drive bracket 60 is completely accommodated within the chassis 20 (see FIG. 5). At this stage, the second drive bracket 60 is defined to be in a second position.

Finally, the fastener 90 is placed over the pivot portion 52 of the first drive bracket 40 with an orientation of approach of about 45 degrees to the vertical. The pivot portion 52 enters the channel 98 of the fastener 90 until the through hole 54 of the pivot portion 52 aligns with the pivot holes 100 of the fastener 90. The post 94 is extended through the pivot holes 100 and through the through hole 54, and interferentially engages with the through hole 54. Then the fastener 90 is rotated counterclockwise about the post 94 until the protrusion 88 of the second drive bracket 60 is received in the cutout 104 of the fastener 90 (see FIG. 6). Thus the second drive bracket 60 is easily and securely attached to the chassis 20.

Access to the computer enclosure 10 beneath the second drive bracket 60 may be required when, for example, other components of the computer are to be mounted in the chassis 20. The fastener 90 is firstly rotated clockwise about the post 94 until the cutout 104 of the fastener 90 disengages from the protrusion 88 of the second drive bracket 60. Then the second drive bracket 60 is rotated from the second position to he first position (see FIG. 4). This exposes the interior space of the chassis 20, thereby facilitating placement and removal of components.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A computer enclosure comprising:
a panel defining at least one slot;
a first drive bracket attached to the panel, the first drive bracket having a first retaining portion;
a fastener pivotably attached to the first drive bracket; and
a second drive bracket having at least one hook for engaging with the at least one slot of the panel thereby allowing the second drive bracket to rotate from a first position to a second position in which the second drive bracket engages with the fastener and is secured to the panel, a retaining cutout being defined in the second drive bracket for engaging with the first retaining portion in the second position.

2. The computer enclosure as described in claim 1, wherein in the first position the second drive bracket is releasable from the panel.

3. The computer enclosure as described in claim 1, wherein the first drive bracket forms a pivot portion with a through hole defined therethrough, and the fastener defines a pair of concentric pivot holes for extension of a post therethrough to engage with the through hole, thereby allowing the fastener to rotate about the pivot portion.

4. The computer enclosure as described in claim 3, wherein the fastener defines at least one cutout therethrough, and the second drive bracket has at least one protrusion for being received in the at least one cutout, thereby securing the second drive bracket at the second position.

5. The computer enclosure as described in claim 1, wherein the first drive bracket has a retaining breach, and the second drive bracket has a second retaining portion for respectively engaging with the retaining breach of the first drive bracket.

6. The computer enclosure as described in claim 5, wherein the first drive bracket comprises a bottom wall and a side wall, and the second drive bracket comprises a top panel and a side panel, and wherein the first retaining portion is formed in the bottom wall, the retaining breach is defined through both the bottom wall and side wall, the second retaining portion is formed in the top panel, and the retaining cutout is defined through both the top panel and the side panel.

7. The computer enclosure as described in claim 1, wherein the panel defines a first opening and a second opening respectively corresponding to the first drive bracket and the second drive bracket.

8. The computer enclosure as described in claim 7, wherein the panel defines at least one retaining aperture below the second opening, and the second drive bracket forms at least one tab for engaging with the at least one retaining aperture.

9. The computer enclosure as described in claim 8, wherein the second drive bracket has at least one flange at an edge thereof for abutting the panel, and wherein the at least one tab is formed in the flange.

10. A computer enclosure comprising:
a vertical front panel defining an opening;
a drive bracket including a top panel, an opposite bottom panel, a first panel and an opposite second panel commonly defining an internal space therein;
means for pivotally securing the drive bracket to the front panel, said drive bracket hinged about one vertical edge of the front panel;
means for securing the drive bracket in position with regard to the front panel once the internal space is aligned with the opening in a front-to-back direction; wherein
said means for securing the drive bracket performs rotation on a vertical plane.

11. The enclosure as described in claim 10, wherein the drive bracket is rotated about a first axis extending along a first direction, and the means for securing the drive bracket is rotated about a second axis extending along a second direction, said first direction and said second direction being perpendicular to each other.

* * * * *